US010416905B2

(12) United States Patent
Rogers et al.

(10) Patent No.: US 10,416,905 B2
(45) Date of Patent: Sep. 17, 2019

(54) MODIFYING MEMBERSHIP OF REPLICATION GROUPS VIA JOURNAL OPERATIONS

(71) Applicant: HEWLETT PACKARD ENTERPRISE DEVELOPMENT LP, Houston, TX (US)

(72) Inventors: Nathaniel Rogers, Fremont, CA (US); Sonali Somyalipi, Fremont, CA (US); Robert Neal-Joslin, Fremont, CA (US); Lisa Liu, Fremont, CA (US); Sujatha Mudupalli, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 138 days.

(21) Appl. No.: 15/428,455

(22) Filed: Feb. 9, 2017

(65) Prior Publication Data
US 2018/0225052 A1 Aug. 9, 2018

(51) Int. Cl.
*G06F 3/06* (2006.01)
*G06F 11/14* (2006.01)
*G06F 11/20* (2006.01)

(52) U.S. Cl.
CPC ............ *G06F 3/0619* (2013.01); *G06F 3/065* (2013.01); *G06F 3/067* (2013.01); *G06F 3/0665* (2013.01);
(Continued)

(58) Field of Classification Search
CPC ............. G06F 2201/84; G06F 2201/82; G06F 2201/855; G06F 3/0619; G06F 3/065;
(Continued)

(56) References Cited

U.S. PATENT DOCUMENTS 6,859,811 B1    2/2005   Chandrasekaran et al.
7,305,530 B2   12/2007   Daniels et al.
(Continued)

OTHER PUBLICATIONS

"Using EMC Recoverpoint Concurrent Local and Remote for Operational and Disaster Recovery," Feb. 2011, pp. 1-30, White Paper, EMC Corporation.
(Continued)

*Primary Examiner* — Tracy A Warren
(74) *Attorney, Agent, or Firm* — Hewlett Packard Enterprise Patent Department

(57) ABSTRACT

An example method of controlling a storage system that includes a replication group. The method may include adding a virtual volume to the replication group by storing a journal entry for the virtual volume at a source site. The journal entry may include: metadata for hooking the virtual volume to a corresponding replica volume; and data indicating a status of the virtual volume. The method may further include sending a message to a replica site instructing it to create the corresponding replica volume for the virtual volume and store a replica journal entry for the replica volume. The method may also include determining whether to set the status of the virtual volume to pending admittance or newly admitted based on whether the replica site was able to successfully create the replica volume and store the replica journal entry. The pending admittance status may indicate that the virtual volume is not to be included in a next synchronize operation and the newly admitted status may indicate that the virtual volume is to be included in the next synchronize operation.

21 Claims, 8 Drawing Sheets

(52) U.S. Cl.
CPC ...... *G06F 11/1425* (2013.01); *G06F 11/1451* (2013.01); *G06F 11/1464* (2013.01); *G06F 11/2064* (2013.01)

(58) Field of Classification Search
CPC .. G06F 3/0665; G06F 3/067; G06F 17/30191; G06F 17/3088; G06F 17/30785; G06F 11/1425; G06F 11/1451; G06F 11/1464; G06F 11/2064
See application file for complete search history.

(56) References Cited

U.S. PATENT DOCUMENTS

| | | | |
|---|---|---|---|
| 7,529,901 | B2 | 5/2009 | Hirakawa et al. |
| 7,577,867 | B2 | 8/2009 | Lewin et al. |
| 8,271,441 | B1 | 9/2012 | Natanzon et al. |
| 8,364,648 | B1 | 1/2013 | Sim-Tang |
| 8,392,679 | B2 | 3/2013 | Okada et al. |
| 8,516,489 | B2 | 8/2013 | Laverone et al. |
| 8,600,945 | B1 | 12/2013 | Natanzon et al. |
| 8,954,796 | B1 | 2/2015 | Cohen et al. |
| 9,069,827 | B1 | 6/2015 | Rath et al. |
| 2005/0193037 | A1 | 9/2005 | Adiba et al. |
| 2006/0020664 | A1* | 1/2006 | Umeda ............ G06F 3/0608 709/203 |
| 2006/0031594 | A1* | 2/2006 | Kodama ............ G06F 11/2058 710/5 |
| 2007/0061616 | A1* | 3/2007 | Watanabe ........... G06F 11/2058 714/6.1 |
| 2011/0213781 | A1* | 9/2011 | Hansel ............. G06F 17/30578 707/741 |

OTHER PUBLICATIONS

Wikipedia, "Replication (computing)," available online at <https://en.wikipedia.org/w/index.php?title=Replication_(computing)&oldid=745415036>, Oct. 21, 2016, 6 pages.

Hewlett Packard Enterprise Development LP, "HPE 3PAR StoreSery Architecture," Document 4AA3-3516ENW, Rev. 8, Mar. 2016, 41 pages.

European Search Report and Search Opinion Received for EP Application No. 17209412.0, dated Jul. 20, 2018, 10 pages.

* cited by examiner

Fig. 2

| VV ID | Options | Metadata | Pending Admit | New Admit | Synching | Synched | Pending Removal | Imminent Removal | Pre-pending Removal |
|---|---|---|---|---|---|---|---|---|---|
| 2482 | ... | ... | 0 | 0 | 0 | 1 | 0 | 0 | 0 |
| 5378 | ... | ... | 0 | 0 | 0 | 1 | 0 | 0 | 0 |
| 7534 | ... | ... | 0 | 0 | 0 | 0 | 1 | 0 | 0 |
| 4568 | ... | ... | 1 | 0 | 0 | 0 | 0 | 0 | 0 |
| | | | 0 | 0 | 0 | 0 | 0 | 0 | 0 |
| | | | 0 | 0 | 0 | 0 | 0 | 0 | 0 |

MODIFYING MEMBERSHIP OF REPLICATION GROUPS VIA JOURNAL OPERATIONS

BACKGROUND

Storage systems may provide replication services, which may replicate data between storage devices at different sites.

BRIEF DESCRIPTION OF THE DRAWINGS

FIG. 2 is a conceptual diagram illustrating an example replication group membership data structure for storing journal entries.

DETAILED DESCRIPTION

Figure 1:
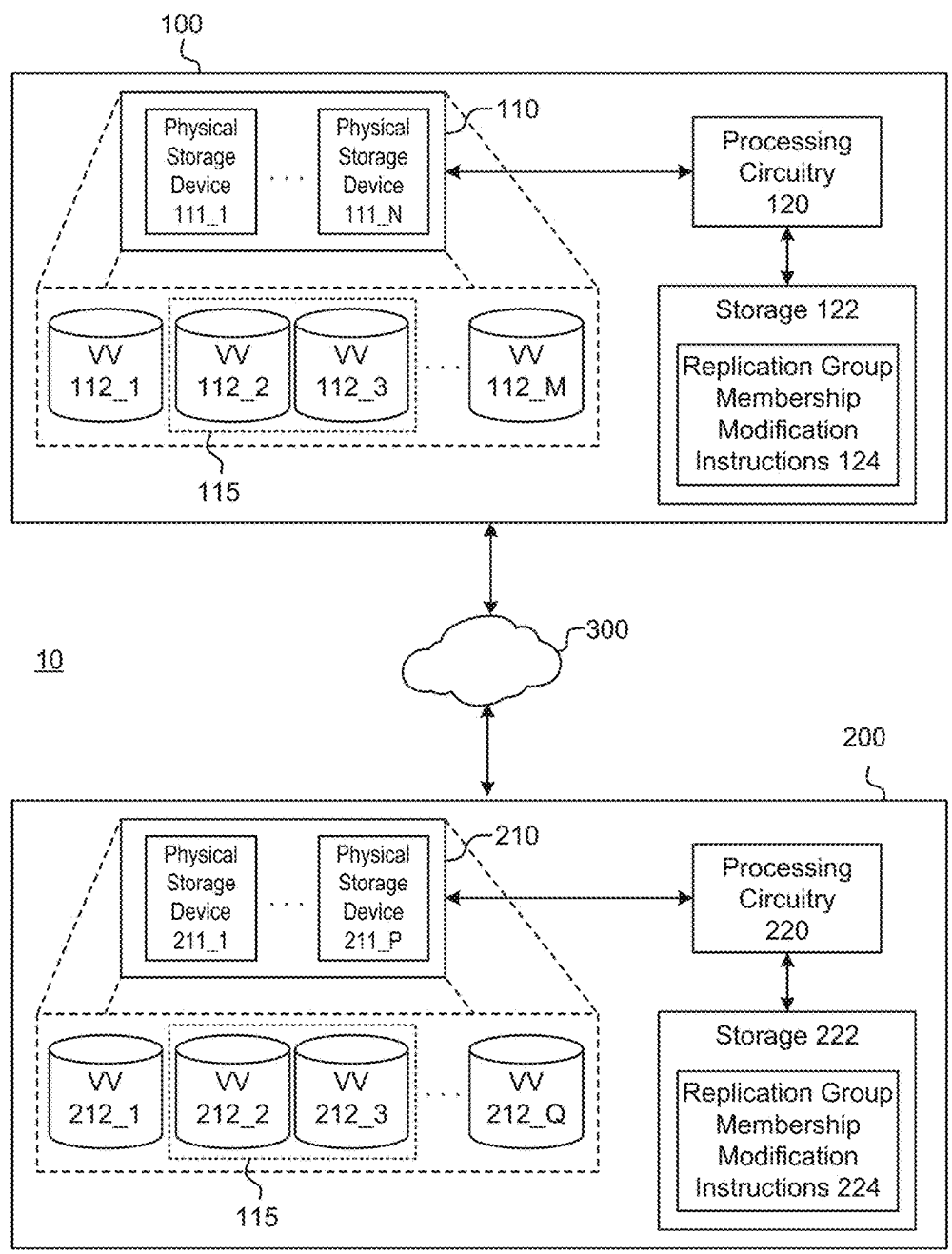
FIG. 1 is a conceptual diagram illustrating an example system comprising a source site, a replica site, and a network.

A storage system my replicate data from storage devices at one site (hereinafter the "primary site" or "source site") to storage devices at another site (hereinafter, the "replica site") to provided redundancy. For example, the replica site may be geographically remote from the primary site to provide redundancy in the event of a site-wide problem at the primary site. As part of replication services provided by a storage system, the storage system may allow for the creation of a replication group, which is a collection of virtual volumes that are to be replicated together with data consistency. Data consistency in this context means that replica volumes at the replica site are consistent with a point-in-time "snapshot" of all of the volumes in the replication group (the same point in time for all volumes in the replication group). In other words, data consistency means that, each time a replication operation is performed, individual snapshots of each virtual volume in the replication at the primary site are atomically replicated to the replica site, where each of the snapshots is from the same point-in-time. The operation that replicates the virtual volumes in the replication group with data consistency may be referred to herein as a "synchronization operation."

Example storage systems described herein may provide for replication groups in which a synchronization operation is performed for the replication group periodically (i.e., at specified time intervals). In certain examples, the membership of a replication group may be modified (e.g., virtual volumes may be added to and/or removed from the replication group) using example journaling operations. In particular, a virtual volume may be added to the replication group by storing, at the primary site, a journal entry for the virtual volume that includes, among other things, status flags for the virtual volume, and then messaging the replica site to add a corresponding replica volume by making a journal entry at the replica. In addition, a virtual volume may be removed from the replication group by changing the status flag in the virtual volume's journal entry to indicate removal. Upon the occurrence of a next synchronization operation, the treatment of the virtual volume may depend on its current status (as indicated by the status flags in the journal entry for the virtual volume). In particular, upon the occurrence of a next synchronization operation, virtual volumes with a newly admitted status may be synchronized to the replica site and/or the removal of virtual volumes with pending removal status may be completed.

By using the example journaling operations, replication group membership may be modified without the need for links between the primary site and replica site to be functioning at the time of the modification. In addition, by using the example journaling operations, replication group membership may be modified without stopping the replication group while the modifications are made. Stopping the replication group means preventing the periodic synchronization operations from being performed for the group until the group is restarted.

Furthermore, using the example journaling operations also allows for the replication group's membership to be updated consistently with the data on the volumes at the point in time that the group's membership is modified. In other words, in addition to data consistency, the example journaling operations also allow for there to be consistency between the group membership and the data at a point in time. More specifically, for each synchronization operation, the membership of the group at a point in time and a snapshot of the data at the same point in time may be atomically replicated to the replica site. Thus, for example, if a replica site is to be rolled-back to a previous point in time (e.g., as part of a failover mechanism), then both the group membership and the data at the previous point in time will be correctly represented in the replica site for the previous point in time.

[Example Storage System]

FIG. 1 illustrates an example storage system 10. The example storage system 10 may include a primary site 100 (also referred to occasionally herein as a source site) and a replica site 200, which may be communicably connected via a network 300. The primary site 100 may include a storage array 110, processing circuitry 120, and storage 122. Similarly, the replica site 200 may include a storage array 210, processing circuitry 220, and storage 222.

The network 300 may include one or more communications pathways (links) that may statically or dynamically connect the primary site 100 and the replica site 200. In certain examples, the network 300 may include a number of active networking devices, such as switches, routers, etc., that may be to form the links between the primary site 100 and the remote site 200. In other examples, the network 300 may omit any active network devices—for example, the network 300 may include cables that directly connect the primary site 100 and the remote site 200.

In certain examples, the storage array 110, the processing circuitry 120, and the storage 122 may all be included as part of a same device (i.e., within a same chassis), while in other examples some or all of the storage array 110, the processing circuitry 120, and the storage 122 may be included in separated devices (i.e., within separate chassis). Similarly, in certain examples, the storage array 210, the processing circuitry 220, and the storage 222 may all be included as part of a same device, while in other examples some or all of the storage array 210, the processing circuitry 220, and the storage 222 may be included in separated devices. In certain examples, the primary site 100 and the replica site 200 may be located at different geographic locations (e.g., in different buildings, in different cities, in different states, in different countries, etc.), while in other examples the primary site 100 and the replica site 200 may be located together at the same geographic location.

The storage array 110 may include one or more physical storage devices 111. The storage array 210 may also include one or more physical storage devices 211. The physical storage devices 111 and 211 may include any non-volatile storage media, such as magnetic storage media (e.g., hard disk drives), non-volatile memory (NVM) (e.g., flash drives (aka solid state drives), memristors, battery-backed RAM, etc.), tape drives, etc. The physical storage devices 110 and 210 do not necessarily need to all include the same type of storage media.

The physical locations of data stored in the storage array 110 may be abstracted by the processing circuitry 120 via storage virtualization techniques. In particular, the processing circuitry 120 may form various levels of virtualization that may each include a number of virtual (aka logical) storage spaces, with each virtual storage space mapping to either another virtual storage space or to physical storage locations of the storage array 110. In particular, the processing circuitry may form a number of virtual volumes 112, which are virtual storage spaces that are visible to client devices. Each virtual volume 112 does not necessarily correspond to a single physical storage device 111—for example, multiple virtual volumes 112 may map to a single physical storage device 111 and a single virtual volume 112 may map to multiple physical storage devices 111. The structure of data as input to a given level of virtualization is not necessarily identical to the structure of the data as stored in the next level of virtualization or in the physical storage locations of the storage array 110. For example, certain virtualization layers may provide functionalities such as encoding data, interleaving data, striping data, implementing RAID levels, and so forth, which might alter the structure of the data as ultimately stored at the physical storage locations.

The processing circuitry 220 may use similar storage virtualization techniques as those described above. In particular, the processing circuitry 220 may form replica volumes 212, which may each be a virtual storage space that is a replica of one of the virtual volumes 112. In this context, a replica volume 212 being a "replica" of a virtual volume 112 means that the replica volume 212 stores data corresponding to a point-in-time copy or snapshot of data on the virtual volume 112. The stored data in the replica volume 212 need not necessarily be in the exact same structure as it is in the virtual volume 112, as long as the point-in-time copy of the data from the virtual volume 112 may be recovered from the replica volume 212. For example, the replica volume 212 may store an initial snapshot of the virtual volume 112 and then may periodically (i.e., as part of each synchronization operation) store data indicating changes that have occurred to the virtual volume 112 since a last synchronization operation.

The processing circuitry 120 may control the storage array 110, including managing the virtual volumes 112 and other virtual storage spaces as described above. The processing circuitry 120 may also manage replication services described herein, including performing operations including the synchronization operation, failover operations, and restoration operations. Specifically, the processing circuitry 120 may form a replication group 115, which includes at least two virtual volumes 112, and may perform the replication group modification operations described herein (e.g., adding and/or removing virtual volumes 112 to/from the replication group 115).

The processing circuitry 220 may control the storage array 210, including managing the replica volumes 212 and other virtual storage spaces as described above. The processing circuitry 220 may also manage replication services described herein, including performing the synchronization operation, failover operations, and restoration operations. Specifically, the processing circuitry 220 may form replica volumes 212 for the virtual volumes in the replication group 115, and may participate in the replication group modification operations described herein.

The processing circuitry 120 and 220 may each include any combination of processors and special-purpose circuitry. In particular, the processing circuitry 120 and 220 may each include one or more processors that are capable of executing machine-readable instructions, such as central processing units (CPUs), microprocessors, microcontrollers, digital signal processors (DSPs), field-programmable gate arrays (FPGAs), application-specific instruction set processors (ASIPs), etc. Such machine readable instructions may be stored, for example, in the storage 122 and/or the storage 222, and when executed by the processing circuitry 120 and/or 220 may cause the processing circuitry 120 and/or 220 to perform some or all of the operations described herein. The processing circuitry 120 and 220 may also each include special-purpose circuitry to perform one, some, or all of the operations described herein. Examples of such special-purpose circuitry may include application-specific integrated circuits (ASICs), complex programmable logic devices (CPLD), and so on.

The storage 122 and 222 may each store machine readable instructions, such as the replication group membership modification instructions 124 (hereinafter "instructions 124") and the replication group membership modification instructions 224 (hereinafter "instructions 224"), which may be executed by the processing circuitry 120 and 220, respectively. In particular, the instructions 124 and 224 may, when executed, cause the processing circuitry 120 and 220, respectively, to perform operations described herein in connection with modification of the membership of a replication group—specifically, operations of pertaining to the addition and/or removal of a virtual volume 112 to/from the replication group 115. In particular, the instructions 124 and/or 224 may include instructions to perform some or all of the operations illustrated in FIGS. 3-7. The storage 122 and 222 may each be any non-transitory machine readable medium, which may include volatile storage media (e.g., DRAM, SRAM, etc.) and/or non-volatile storage media (e.g., PROM, EPROM, EEPROM, NVRAM, flash, hard drives, optical disks, etc.). In examples in which the processing circuitry 120 is constituted entirely by special-purpose circuitry and does not include a processor, the storage 122/222 and the instructions 124/224 may be omitted.

In general, the processing circuitry 120 (and the instructions 124, if included) may be configured to perform at least the operations described herein in relation to the primary site 100. Similarly, the processing circuitry 220 (and the instructions 224, if included) may be configured to perform at least the operations described herein in relation to the replica site 100.

However, in certain examples, the processing circuitry 120 (and the instructions 124, if included) may additionally be configured to perform some or all of the operations described herein in relation to the replica site 200, and the processing circuitry 220 (and the instructions 224, if included) may additionally be configured to perform some or all of the operations described herein in relation to the primary site 100. In other words, in some examples the primary site 100 may be configured to perform not just the operations described herein in relation to the primary site 100, but also may be capable of performing some or all of the operations described herein in relation to the replica site 200, and vice-versa for the replica site 200. In such examples, the primary site 100 and the replica site 200 may be able to reverse roles. In other words, the replica site 200 may be able to act as a primary and the primary site 100 may be able to act as a replica. In such examples, the instructions 124 and the instructions 224 may be identical sets of instructions, and the processing circuitry 120 and 220 may selectively execute portions of the instructions 124/224 depending on the current roles of the primary site 100 and replica site 200.

Such a change in roles may occur, for example, as part of a failover mechanism. For example, if the primary site 100 were to go down, then the replica site 200 may be able to take over acting as the primary, including handling I/O requests from client devices. When the primary site 100 comes back online, the replica site 200 may execute a recover operation that synchronizes data back to the primary site 100.

FIG. 1 illustrates an example in which the processing circuitry 120 and 220 are separate instances of processing circuitry. However, in certain examples the processing circuitry 120 and 220 may be formed by a single instance of process circuitry—that is, a single instance of processing circuitry may act as both the processing circuitry 120 and 220. In such examples, a single instance of storage may serve as both the storage 122 and 222, and a single set of instructions may serve as the instructions 124/224.

Although one primary site 100 and one replica site 200 are illustrated in FIG. 1, this is merely one example and additional primary sites and replica sites could be included. For example, multiple primary sites may replicate to a single replica site, and a single primary site may replicate to multiple replica site.

[Example Group Membership Modification Operations]

As noted above, replication group membership modification may include the addition of a virtual volume to the replication group and the removal of a virtual volume from the replication group, and in examples described herein such modifications may be made via journaling operations, which will be described in greater detail below. These journaling operations may also have ramifications for synchronization, failover, and/or recovery operations, and therefore portions of such operations will also be described below as part of the group membership modification operations. Virtual volume addition will be described first, followed by virtual volume removal, followed by failover and recover, with synchronization operations being described together with the addition and removal operations as relevant.

[Example Virtual Volume Addition Operations]

A virtual volume 112 may be added to the replication group 115 by storing a journal entry for the virtual volume 112 at the primary site 100 including noting a pending admittance status for the virtual volume 112, sending a message to the replica site 200 instructing it to add a replica volume corresponding to the virtual volume 112 by storing a replica journal entry at the replica site, and determining whether to change the status of the virtual volume 112 based on whether the replica site 200 was able to successfully store the replica journal entry. In particular, the journal entry may include metadata for hooking the virtual volume 112 to a corresponding replica volume 212, and data indicating a status of the virtual volume 112, where the status of the virtual volume 112 upon initial creation of the journal entry is pending admittance. The status of the virtual volume 112 may be indicated, for example, by status flags in the journal entry.

The journal entry may be stored, for example, together with journal entries of other virtual volumes that are members of the replication group 115 in a group membership data structure 50. For example, the journal entries may be stored in a table of contents (TOC) of the storage system 10. In certain examples, the group membership data structure 50 may be stored redundantly in more than one (perhaps all) of the physical storage devices 111. FIG. 2 illustrates one example of the group membership data structure 50, with each row corresponding to an example journal entry. Each of the example journal entries in FIG. 2 includes an identification of the virtual volume 112 (VV ID), options designated for the virtual volume 112, metadata for hooking a replica volume 212 to the virtual volume 112, and status flags to indicate various statuses. In FIG. 2, the example status flags including a pending admit flag, a new admit flag, a synching flag, a synched flag, a pending removal flag, an imminent removal flag, and a pre-pending removal flag. FIG. 2 is merely one example, and it should be understood that the journal entries could include more or less information, including more or fewer status flags.

In certain examples, the journal entry may also include options that specify how the virtual volume 112 is to be handled in various circumstances. For examples, the options may include data specifying: whether group membership and volume data consistency is required, how to handle failures when adding replica virtual volumes to the group, etc.

The message that is sent to the replica site 200 may include, for example, information that may be used by the remote site 200 as part of creating a replica volume 212 corresponding to the newly added virtual volume 112. For example, the message may include a copy of the metadata that was stored in the journal entry at the primary site 100, which may be for hooking a newly created replica volume 212 to the virtual volume 112. The message may also include some or all of the options from the journal entry that was stored at the primary site 100. The information included in the message (e.g., the metadata and options) may be stored by the replica site 200 as a journal entry. The replica journal entry may also store a status of the replica volume 212, which may initially be set to new admit. The journal entry stored at the replica site 200 may be referred to herein as a replica journal entry to distinguish it from the journal entry stored at the primary site 100. Upon successfully creating the replica volume 212 that corresponds to the virtual volume 112 and storing the replica journal entry, the replica site 200 may send an acknowledgement back to the primary site 100 that includes an indication of success. If the replica site 200 received the message from the primary site 100 but is unable to create the replica volume 212 for some reason, the replica site 200 may send an acknowledgement back to the primary site 100 that includes an indication of failure and/or error codes.

The replica journal entries may be similar to the journal entries, and may be stored in the replica site 200 in a similar fashion to how the journal entries are stored in the primary site 100. However, in certain examples the replica journal entries may omit the pending admit flag; in certain other examples, the replica journal entries may include the pending admit flag but may refrain from using it (unless the replica site 200 is acting as the primary during failover).

As noted above, the journaling operation for adding a virtual volume 112 to the replication group 115 may include determining whether to change the status of the virtual volume 112 based on whether the replica site 200 was able to successfully create the replica volume 212 for the virtual volume 112 and store the replica journal entry. More specifically, if it is determined that the replica site 200 successfully created the replica volume 212 and stored the replica journal entry, then the status of the virtual volume 112 is changed from pending admit to new admit.

The "pending admit" status indicates that the virtual volume 112 is in the process of being added to the replication group 115, but that the process has not completed. More specifically, the pending admit status indicates that the primary site 100 has stored a journal entry for the virtual volume 112 but that the replica site 200 has not yet created a replica volume 212 for the virtual volume 112 or stored a replica journal entry for it. Accordingly, any virtual volumes 112 that have the pending admit status at the time when a synchronization operation is begun are not synchronized as part of the synchronization operation. A virtual volume 112 that has the pending admit status may be referred to as a pending admit virtual volume 112. In certain examples, the pending admit status is used in the primary site 100 but not in the replica site 200 (unless the replica site 200 is acting as primary).

The "new admit" status indicates that the virtual volume 112 has been admitted to the group 115, but that the data of the virtual volume 112 has not yet been synchronized to the replica site 200. More specifically, the new admit status indicates that both the primary site 100 and the replica site 200 have stored a journal entry for the virtual volume 112, but that the data of the virtual volume 112 has not yet been synchronized to the replica site 200. Accordingly, any virtual volumes 112 that have the new admit status when a next synchronization operation is begun are included in the synchronization operation—that is, a point-in-time snapshot of the virtual volumes 112 with the new admit status is synchronized to the replica site 200 (along with snapshots of the other virtual volumes 112 that are already in the group 115). A virtual volume 112 that has the new admit status may be referred to as a newly admitted virtual volume 112. Because the snapshots of the newly admitted virtual volumes 112 and the already admitted virtual volumes 112 are for the same point in time, data consistency is maintained between the newly admitted virtual volumes 112 and the already admitted virtual volumes 112. Upon successful completion of the synchronization operation, the status of the newly admitted virtual volumes 112 may be updated in the journal entry at the primary site 100 to an admitted status (e.g., the synched status). In addition, in certain examples, the status of the replica volume 212 that is for the virtual volume 112 may be updated to the admitted status in the corresponding replica journal entry at the replica site 200. Because the synchronization operation is atomic for all members of the replication group 115, it is not successfully completed unless all of the newly admitted and already admitted virtual volumes 115 are successfully synchronized. If the synchronization operation fails to successfully complete, the status of the newly admitted virtual volumes 112 may be maintained in their journal entries as new admit. Similarly, if the synchronization operation fails to successfully complete, the status of replica volumes 212 that are for the newly admitted virtual volumes 112 may be maintained in their replica journal entries as new admit.

The "synching" status indicates that the virtual volume 112 is current being synched as part of a current synchronization operation that is still ongoing, while the "synched" status indicates that the virtual volume was successfully synched as part of a most-recently completed synchronization operation. The synching status and the synched status are both examples of what may be referred to herein as an "admitted status". When a next synchronization operation is begun, any virtual volumes 112 that have the admitted status at that time are included in the synchronization along with any newly admitted virtual volumes 112. A virtual volume 112 that has the admitted status may be referred to as an admitted virtual volume 112.

In certain examples, the addition of the virtual volume 112 may occur without stopping the replication group 115. In particular, the replication group 115 need not be stopped in order to make the journal entry at the primary site 100 or to create the replica volume 212 and store the replica journal entry at the replica site 200. Thus, for example, a virtual volumes 112 may be added to the replication group 115 while a synchronization operation is currently being performed without interrupting the synchronization operation.

In certain examples, the addition of the virtual volumes 112 may occur even when the links between the primary site 100 and the replica site 200 are not functional. In particular, the primary site 100 may make the journal entry for the virtual volume 112 regardless of whether the links are functional. The disabling of the links results in the status of the virtual volume 112 being set to pending admit, but then when the links are re-enabled, the message may be resent to the replica site 200 and the status of the virtual volume 112 may progress to newly admitted.

Figure 3:
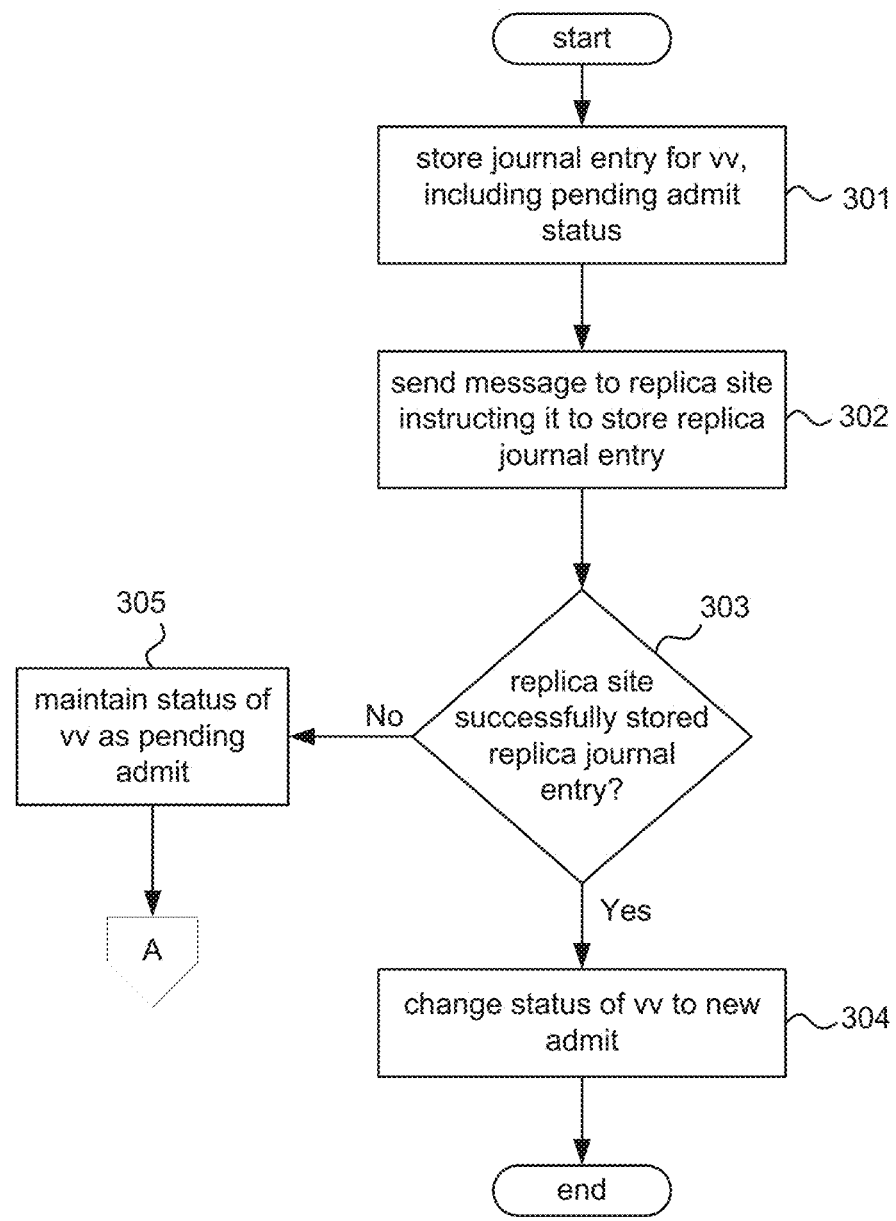
FIG. 3 is a process flow diagram illustrating an example process of adding a virtual volume to a replication group.

FIG. 3 illustrates an example process of adding a virtual volume 112 to the replication group 115. The example process of FIG. 3 may be performed, for example, by the primary site 100 in response to receiving a request to add a virtual volume 112 to the replication group 115. For example, a processor (such as a processor included in the processing circuitry 120) may execute machine readable instructions (such as the instructions 124 or 1010) that cause the processor to perform operations corresponding to the example process of FIG. 3.

In block 301, the primary site 100 stores a journal entry for the virtual volume 112, which includes an indication that the virtual volume 112 has the pending admit status. The process then goes on to block 302.

In block 302, the primary site 100 sends a message to the replica site 200 instructing it to store a replica journal entry for the virtual volume 112. The process then goes on to block 303.

In block 303, the primary site 100 determines whether the replica site 200 successfully created the replica volume 212 and stored the replica journal entry. For example, the primary site 100 may determine that the replica site 200 successfully created the replica volume 212 and stored the replica journal entry if it receives the acknowledgement indicating success back from the replica site within a specified period of time, and may determine that the replica site 200 did not create the replica volume 212 and store the replica journal entry otherwise. As another example, when attempting to send the message to the replica site 200, if the primary site 100 detects that a link between the primary site 100 and replica site 200 is not functional, then the primary site may determine that the replica site 200 did not successfully create the replica volume 212 and store the replica journal entry without waiting for an acknowledgement. As another example, if the primary site 100 receives the acknowledgment indicating failure, then the primary site 100 may determine that the replica site 200 did not create the replica volume 212 and store the replica journal entry. If the answer is yes (the replica site 200 did successfully create the replica volume 212 and store the replica journal entry), then the process goes to block 304. If the answer is no (the replica site 200 did not successfully create the replica volume 212 and store the replica journal entry), then the process goes to block 305.

In block 304, the primary site 100 changes the status of the virtual volume 112 in the journal entry to the new admit status. The process then ends.

In block 305, the primary site 100 maintains the status of the virtual volume 112 as pending admit. In certain examples, after block 305 is performed, the process illustrated in FIG. 4 may also be performed, as indicated by the reference "A". In other examples, the process may end after block 305.

Figure 4:
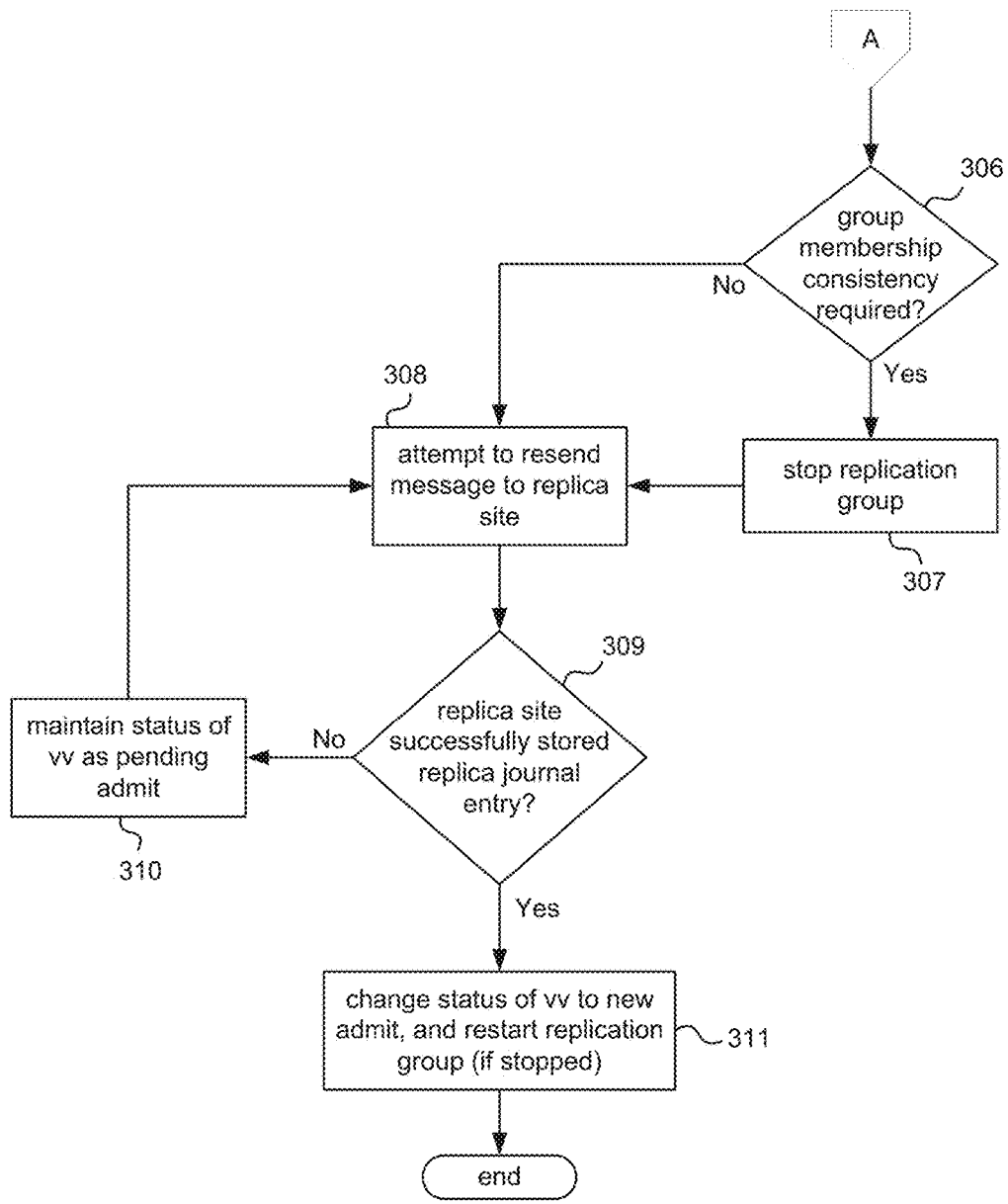
FIG. 4 is a process flow diagram illustrating another example process pertaining to adding a virtual volume to a replication group.

FIG. 4 illustrates an example process for handling virtual volumes whose status is pending admit. For example, a processor (such as a processor included in the processing circuitry 120) may execute machine readable instructions (such as the instructions 124 or 1010) that cause the processor to perform operations corresponding to the example process of FIG. 4. In certain examples, the example process of FIG. 4 may be performed by the primary site 100 when the replica cite 200 fails to successfully store a journal entry for a pending admit virtual volume 112 (e.g., in response to block 305 of FIG. 3 being performed). In certain examples, the source site 100 may periodically check for any virtual volumes 112 that have the pending admit status, and in response to identifying a virtual volume 112 with the pending admit status may perform the process of FIG. 4 for the virtual volume 112.

In block 306, the primary site 100 determines whether the replication group 115 has a requirement for group membership consistency (in addition to data consistency). For example, such a requirement may be selectively enabled or disabled for the replication group 115, for example when the replication group 115 is first established and/or while the replication group 115 is operating. For example, a client may select whether such a requirement is to be imposed on the replication group 115. If the answer is yes (there is a requirement for group membership consistency), then the process goes on to block 307. If the answer is no (there is no requirement for group membership consistency), then the process goes on to block 308. In certain examples, there is always a group membership consistency requirement and there is no option to disable such a requirement; in such examples, the decision block 306 may be omitted and the process may begin directly at block 307. In certain examples, there is never a group membership consistency requirement and there is no option to enable such a requirement; in such examples, the decision block 306 may be omitted and the process may begin directly at block 308.

In block 307, the replication group 115 is stopped. Stopping the replication group 115 means preventing the synchronization operation from being performed for the replication group 115 at its normally scheduled intervals until the replication group 115 is restarted. The process then goes on to block 308.

In block 308, the primary site 100 attempts to resend the message to the replica site 200 once a specified timing is reached (e.g., retry attempts may occur at designated intervals). The process then goes on to block 309. In certain examples, one of the options that is included in the journal entry may specify whether attempts may be made to resend the message and/or how many such attempts may be made; in such examples, block 308 may be omitted if the option allowing resend attempts is not selected or if the maximum number of attempts has been reached, in which case an error report may be generated and the process may end.

In block 309, the primary site 100 determines whether the replica site 200 successfully created the replica volume 212 and stored the replica journal entry, in the same manner described above with respect to block 303 of the process of FIG. 3. If the answer is yes (the replica site successfully created the replica volume 212 and stored the replica journal entry), then the process goes on to block 311. If the answer is no (the replica site did not successfully create the replica volume 212 and store the replica journal entry), then the process goes on to block 310 and then ultimately loops back to block 308.

In block 310, the primary site 100 maintains the status of the virtual volume 112 as the pending admit status. The process then loops back to block 308.

In block 311, the primary site 100 changes the status of the virtual volume 112 to the new admit status. In addition, if the replication group 115 was stopped, then the replication group 115 may be restarted (i.e., periodic synchronization operations may be resumed). The process may then end.

In examples described above, the initial status of a virtual volume 112 upon the journal entry first being stored is the pending admit status, and then the status of the virtual volume 112 is changed to new admit if the replica site 200 successfully creates the replica volume 212. However, in other examples, the virtual volume 112 may have a different initial status (or no initial status at all) upon the journal entry first being stored, and the status of the virtual volume 112 may be changed to pending admit if the replica site 200 fails to create the replica volume 212. In such examples, if the initial status is something other than new admit, then the status of the virtual volume 112 may be changed to new admit if the replica site 200 successfully creates the replica volume 212; however, if the initial status is new admit, then the status may be left as new admit if the replica site 200 successfully creates the replica volume 212.

[Example Virtual Volume Removal Operations]

A virtual volume 112 may be removed from the replication group 115 by changing the status of the virtual volume 112 in its journal entry at a primary site 100 to the pending removal status, and then waiting for a next periodic synchronization operation to occur.

The "pending removal" status indicates that the virtual volume 112 is in the process of being removed from the replication group 115, but that the process has not completed. More specifically, the pending removal status indicates that the virtual volume 112 is not to be synchronized at the next synchronization operation, and that upon completion of the next synchronize operation the virtual volume 112 is to be cued for removal.

At the beginning of the next synchronization operation, for virtual volumes 112 that have the pending removal status, the replica site 200 may be instructed to change the status of the replica volume 212 that corresponds to the virtual volume 112 to pending removal in the replica journal entry stored at the replica site 200. Then, the replication group 115—excluding the pending removal virtual volume 112—may be synchronized from the primary site 100 to the replica site 200. If the synchronization of the entire replication group 115 (excluding the pending removal virtual volume 112) is completed successfully, then the primary site 100 changes the status of the virtual volume 112 to imminent removal and cues the virtual volume 112 for removal from the replication group 115. In addition, if the synchronization is completed successfully, the replica site 200 may also change the status of the replica volume 212 that corresponds to the virtual volume 112 to imminent removal in the replica journal entry. However, if the synchronization is not completed successfully, then the status of the virtual volume 112 may be maintained as pending removal. Similarly, if the synchronization is not completed successfully, then the status of the replica volume 212 that corresponds to the virtual volume 112 may be maintained as pending removal.

The "imminent removal" status indicates that the virtual volume 112 (or replica volume 220) is to be removed from the replication group 115 and that a synchronization has been successfully completed after it was marked for removal. The imminent removal status, once set, will always ultimately result in the removal of the virtual volume 112 and the replica volume 212 from the group 115 regardless of whether a failover event occurs after the status is set. This is in contrast to the pending removal status, which might be set and yet sometimes not result in removal of the virtual volume 112/replica volume 212 if a failover event occurs. These phenomenon will be described in greater detail below in relation to failover operations.

In certain examples, some virtual volumes 112 do not have their status changed to pending removal immediately upon their removal being requested. Instead, some virtual volumes 112 may have their status changed to a pre-pending removal status. Virtual volumes 112 with the pre-pending removal status are synchronized during a next synchronization operation, and then after the next synchronization operation is completed the status of the pre-pending removal virtual volumes 112 may be changed to pending removal (whereupon the virtual volumes 112 may be treated as described above). Specifically, for each synchronization operation, any virtual volumes 112 with a pre-pending status are synchronized during that synchronization operation and their status is: (A) maintained as pre-pending removal if the synchronization operation fails to complete, or (B) changed to pending removal if the synchronization operation successfully completes.

For example, virtual volumes 112 whose re-synchronization snapshot at the source site 100 does not match a replica at the replica site 200 may have their status changed to pre-pending removal. A re-synchronization snapshot of a virtual volume 112 represents the content of the corresponding replica volume 112 at the end of the last successfully completed synchronization operation. Thus, the current re-synchronization snapshot for the virtual volumes may be the same as the synchronization snapshot that was created for the virtual volume 112 as part of the last synchronization operation—for example, the synchronization snapshot used in the synchronization operation may be converted into the re-synchronization snapshot once the synchronization operation is completed. For example, virtual volumes 112 that are currently being synched may have a re-synchronization snapshot at the source site 100 that does not match their replica at the replica site 200, and hence may have their status changed to pre-pending removal. As another example, virtual volumes 112 that have the new admit status may not have a re-synchronization snapshot at the source site 100 that matches a replica at the replica site 200, and may have their status changed to pre-pending removal. In certain examples, if request to remove a virtual volume 112 is received when the virtual volume 112 has a pending admit status, then the virtual volume 112 may be removed immediately without waiting for a next synchronization operation. In particular, the status of the pending admit virtual volume 111 may be changed to imminent removal and the virtual volume 112 may be cued for removal.

Figure 5:
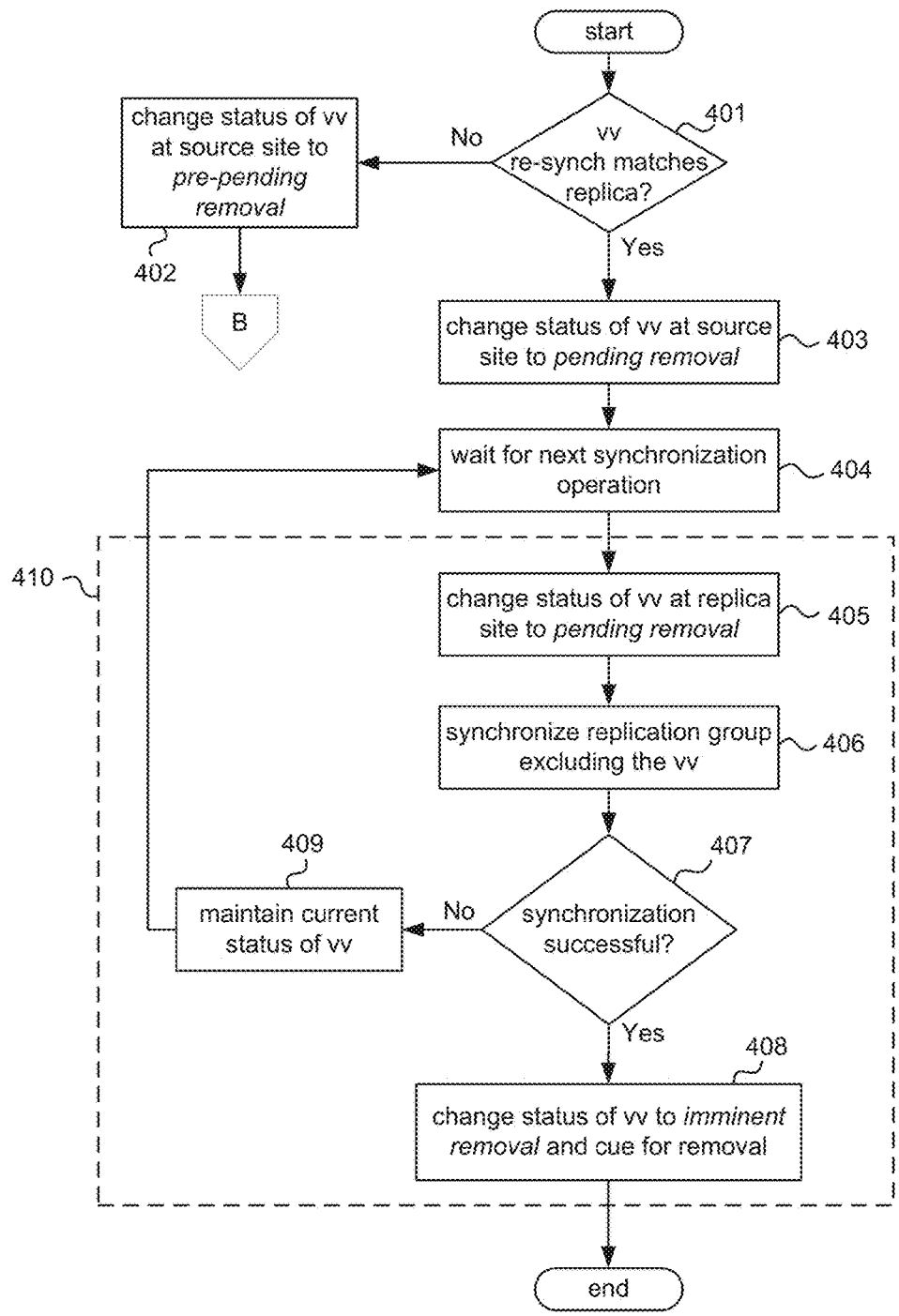
FIG. 5 is a process flow diagram illustrating an example process of removing a virtual volume from a replication group.

FIG. 5 illustrates an example process for removing a virtual volume 112 from the replication group 115. The process may be performed, for example, by the primary site 100 in response to receiving a request to remove a virtual volume 112 from the replication group 115. For example, a processor (such as a processor included in the processing circuitry 120) may execute machine readable instructions (such as the instructions 124 or 1010) that cause the processor to perform operations corresponding to the example process of FIG. 5.

In block 401, the primary site 100 determines whether the virtual volume has a re-synchronization snapshot that matches a replica stored at the replica site 200.

If the answer in block 401 is no, then the process continues to block 402, in which the primary site 100 changes the status of the virtual volume to pre-pending removal. The process may then continue to the reference B of the process of FIG. 6.

If the answer in block 401 is yes, then the process continues to block 403, in which the primary site 100 changes the status of the virtual volume 112 to pending removal. The process then goes to block 402.

In block 404, the primary site 100 waits for the next periodic synchronization operation. Upon the next synchronization operation beginning, the process goes to block 405. Operations that are performed during or as part of a synchronization operation, such as blocks 405-409, may be indicated in FIG. 5 by the reference sign 410.

In block 405, the primary site 100 instructs the replica site 200 to change the status of the replica volume 212 that corresponds to the virtual volume 112 to the pending removal status. The process then proceeds to block 406.

In block 406, the replication group 115—excluding the pending removal virtual volume 112—is synchronized to the replica site 200. The process then proceeds to block 407.

In block 407, it is determined whether the synchronization of the replication group 115 was successfully completed. In other words, it is determined whether synchronization snapshots for the replication group 115 (excluding the virtual volume 112) were replicated to the replica site 100 and re-synchronization snapshots for the replication group 115 were successfully created at the primary site 100. If the answer is yes (the synchronization of the replication group was successfully completed), then the process goes to block 408. If the answer is no (the synchronization of the replication group was not successfully completed), then the process goes to block 409.

In block 408, the primary site 100 changes the status of the virtual volume 112 to imminent removal, and cues the virtual volume 112 for removal from the group 115. In certain examples, the replica site 200 may also change the status of the replica volume 212 that corresponds to the virtual volume 112 to imminent removal, and cue the replica volume 212 for removal from the group 115. The process may then end.

In block 409, the primary site 100 maintains the status of the virtual volume 112 as pending removal. In certain examples, the replica site 200 may also maintain the status of the replica volume 212 that corresponds to the virtual volume 112 as pending removal. The process may then loop back to block 404 to wait for the next synchronization operation.

In certain examples, portions of the process of FIG. 5 may be performed each time a synchronization operation is performed. In particular, in certain examples, each time a synchronization operation is performed the process of FIG. 5 may be performed starting at block 405 (i.e., omitting blocks 401-404).

In addition, in example storage systems 10 in which the pre-pending removal status is not used, blocks 401 and 402 of FIG. 5 may be omitted, and the process may begin at block 403.

Note that removal of a virtual volume 112 from the replication group 115 does not mean that the virtual volume 112 is necessarily deleted. In particular, removed virtual volumes 112 may continue to operate, they simply are no longer replicated with consistency in relation to the replication group 115. Whether or not a removed virtual volumes 112 is also deleted may depend, for example, on the status of the virtual volume 112, on options specified in the journal entry, on the configuration of the replication group 115, on a client's instructions, etc.

Figure 6:
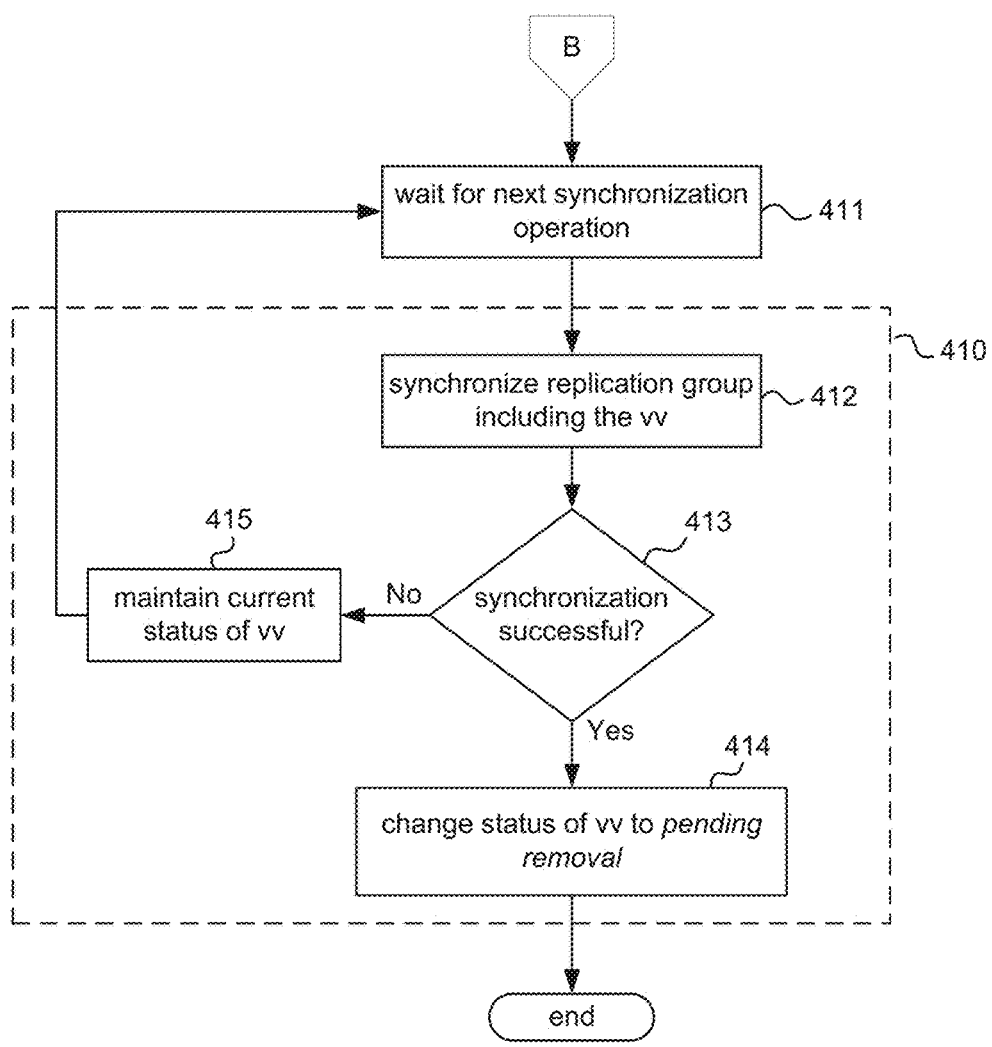
FIG. 6 is a process flow diagram illustrating another example process pertaining to removing a virtual volume from a replication group.

FIG. 6 illustrates an example process for handling virtual volumes 112 that have a pre-pending removal status. The process of FIG. 6 may be performed, for example, after block 402 of FIG. 5 is performed. The process of FIG. 6 may also be performed, for example, at each synchronization operation. For example, a processor (such as a processor included in the processing circuitry 120) may execute machine readable instructions (such as the instructions 124 or 1010) that cause the processor to perform operations corresponding to the example process of FIG. 6.

In block 411, the primary site 100 waits for the next periodic synchronization operation. Upon the next synchronization operation beginning, the process goes to block 412. Operations that are performed during or as part of a synchronization operation, such as blocks 412-415, may be indicated in the FIG. 6 by the reference sign 410.

In block 412, the replication group 115—including the pre-pending removal virtual volume 112—is synchronized to the replica site 200. The process then proceeds to block 413.

In block 413, it is determined whether the synchronization of the replication group 115 was successfully completed. In other words, it is determined whether synchronization snapshots for the replication group 115 (including the virtual volume 112) were replicated to the replica site 100 and re-synchronization snapshots for the replication group 115 were successfully created at the primary site 100. If the answer is yes (the synchronization of the replication group 115 was successfully completed), then the process goes to block 414. If the answer is no (the synchronization of the replication group 115 was not successfully completed), then the process goes to block 415.

In block 414, the primary site 100 changes the status of the virtual volume 112 to pending removal. The process may then end. In certain examples, the process of FIG. 5 may be performed following the completion of the process of FIG. 6.

In block 415, the primary site 100 maintains the status of the virtual volume 112 as pre-pending removal. The process may then loop back to block 411 to wait for the next synchronization operation.

[Example Synchronization Operation]

Figure 7:
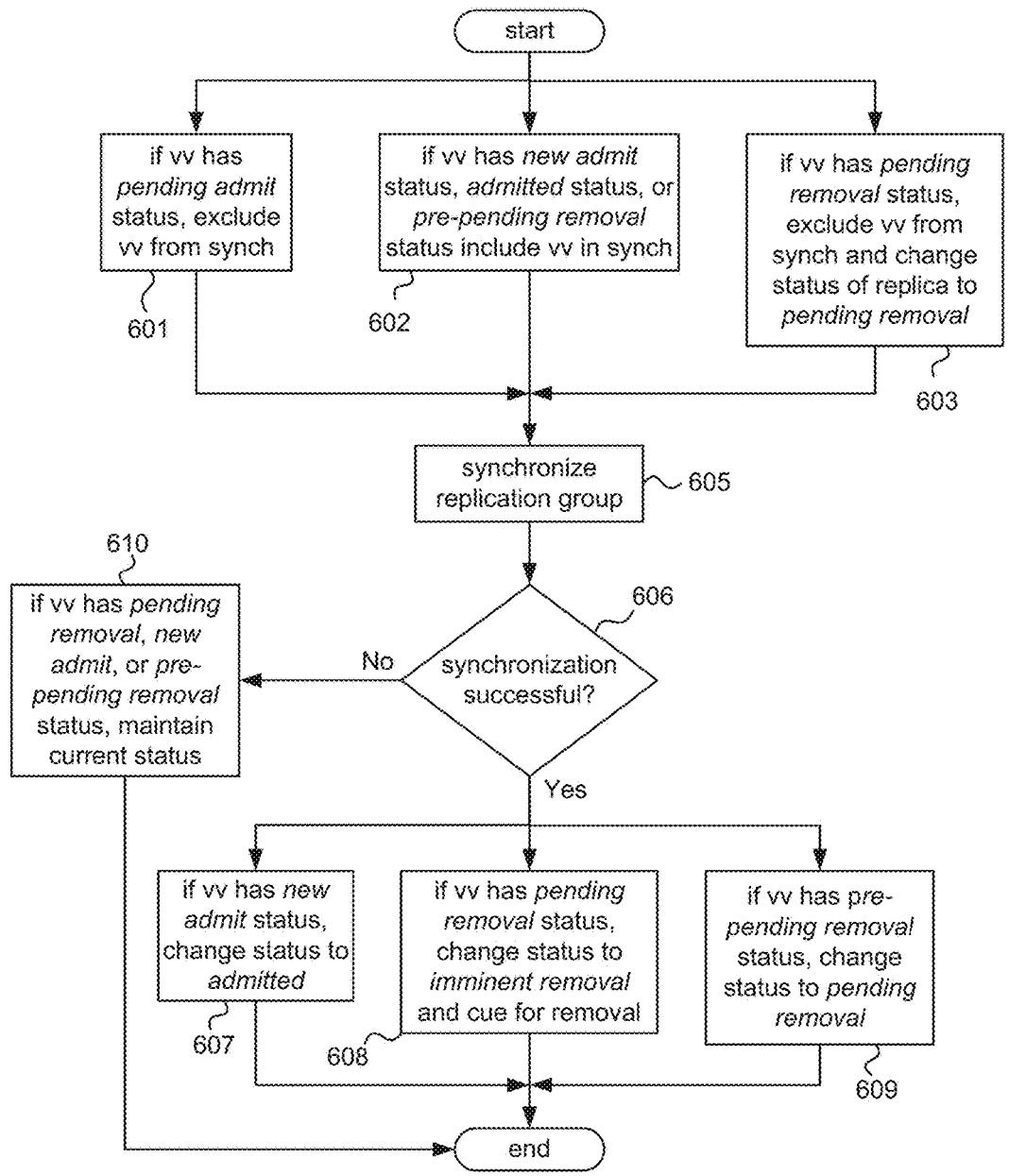
FIG. 7 is a process flow diagram illustrating an example synchronization operation.

FIG. 7 illustrates an example synchronization operation. The example synchronization operation may be performed by the primary site 100 for the replication group 115. For example, a processor (such as a processor included in the processing circuitry 120) may execute machine readable instructions (such as the instructions 124 or 1010) that cause the processor to perform operations corresponding to the example process of FIG. 7. For example, the synchronization operation may be performed periodically.

Blocks 601-603 are performed for each virtual volume 110 that is currently in the replication group 115 (i.e., that currently has a journal entry). In blocks 601-603, virtual volumes 112 are identified for inclusion or exclusion from the current synchronization based on their current status. In particular, in block 601, if the virtual volume 110 has the pending admit status, then the virtual volume 110 is excluded from the current synchronization. In block 602, if the virtual volume 110 has the new admit status, the admitted status, or the pre-pending removal status, then the virtual volume 110 is included in the current synchronization. In block 603, if the virtual volume 110 has the pending removal status, then the virtual volume 110 is excluded from the current synchronization and the status of the corresponding replica volume 212 is changed to pending removal at the replica site 200. The process then continues to block 605

In block 605, the replication group 115 (excluding any virtual volumes 112 that were excluded in blocks 601 and 603) is synchronized. In particular, synchronization snapshots may be generated for the same point in time for each of the virtual volumes 112 that is to be included in the current synchronization, the synchronization snapshots may be replicated to the replica site 200, and then the source site 100 may convert the synchronization snapshots into re-synchronization snapshots upon successful completion of the synchronization.

In block 606, it is determined whether the synchronization was successfully completed. Because the synchronization is an atomic operation, it is considered successfully completed if all of the virtual volumes 112 that were designated to participate were successfully replicated.

If the answer in block 606 is yes (the synchronization was successfully completed), then the process continues to blocks 607 through 609, which are performed for each virtual volume 110 that is currently in the replication group 115 (i.e., that currently has a journal entry). In block 607, if the virtual volume 112 has the new admit status, then the status of the virtual volume 112 is changed to the admitted status. In block 608, if the virtual volume 112 has the pending removal status, then the status of the virtual volume 112 is changed to imminent removal and the virtual volume 112 is cued for removal from the group 115. In certain examples, in block 608, if the virtual volume 112 has the pending removal status, then the status of the corresponding replica volume 212 is also changed to imminent removal and the replica volume 212 is also cued for removal. In block 609, if the virtual volume 112 has pre-pending removal status then the status of the virtual volume 112 is changed to pending removal. The process may then end.

If the answer in block 606 is no (the synchronization was not successfully completed), then the process continues to block 610, which is performed for each virtual volume 110 that is currently in the replication group 115 (i.e., that currently has a journal entry). In block 610, if the virtual volume 112 has the pending removal status, the new admit status, or the pre-pending removal status, then the current status of the virtual volume 112 is maintained.

[Example Handling of Group Modifications in Failover Scenarios]

Failover refers to a mechanism whereby the replica site 200 takes over responsibility for acting as the primary. Failover may be invoked, for example, in response to the primary site 100 becoming unavailable, such as, for example, during a site-wide disaster. Failover may also be invoked when maintenance and/or testing is to be performed at the primary site 100. When failover is invoked, the replica volumes 212 in the replica site 200 are reverted back to the most recent consistency point (i.e., the most recent point in time snapshot of all of the virtual volumes 112 of the replication group 115 that was successfully replicated to the replica site 200). In addition, when the primary site 100 is available again, a recovery operation may be performed in which data is replicated back from the replica site 200 to the primary site 100

When reverting back to the most recent consistency point or performing the recovery operation, the group membership of the replication group 115 may be impacted. In particular, the primary site 100 and/or the replica site 200 may need to determine whether virtual volumes 112 that were added and/or removed from the primary site 100 prior to the failover should be in included in the replication group 115 after reverting back to the consistency point and/or after the recovery operation. The statuses described above are used by the primary site 100 and/or the replica site 200 to make such determinations.

For example, if a replica volume 212 has the new admit status at the replica site 200 upon a failover occurring, then that would mean that the failover occurred after the corresponding virtual volume 112 was added to the group but before the next synchronization operation could be successfully completed. Thus, when the replica site 200 reverts to the prior consistency point, the replica volume 212 should not be part of the replication group 115 (since it was not a member of the group 115 at that point in time). Additionally, since the virtual volume 112 did not complete initial synchronization, the replica volume 212 does not contain valid data. Thus, in certain examples the replica volume 212 may be deleted in addition to being removed from the replication group 115. Therefore the replica site 200 may remove any replica volumes 212 that have the new admit status upon failover, and in certain examples may also delete such replica volumes 212.

As another example, if a virtual volume 112 has the pending admit or the new admit status at the primary site 100 upon a recovery operation being performed, that would mean that a failover occurred after the virtual volume 112 was added to the group 115 but before the next synchronization operation could be successfully completed. Thus, there will be no replica of the virtual volume 112 at the replica site 200. Accordingly, to maintain group membership and data consistency, upon the recovery operation the primary site 100 may remove the virtual volume 112 from the group 115. However, in certain examples the virtual volume 112 may not be deleted, since it may contain valuable data. In certain examples, a prompt may be generated for a client indicating that the virtual volume 112 is not part of the replication group 115 due to the failover event but that it had been requested to be added to the replication group 115 prior to the failover event, thus giving the client the option to request again the addition of the virtual volume 112 to the replication group. In certain examples, the addition operation may automatically be begun anew for the virtual volume 112.

As another example, if a replica volume 212 has the pending removal status at the replica site 200 upon a failover occurring, then that would mean that the failover occurred after the corresponding virtual volume 112 was marked for removal from the group and a next synchronization operation was begun, but that the next synchronization operation did not successfully complete. Accordingly, when the replica site 200 reverts to the prior consistency point, the replica volume 212 should remain a part of the replication group 115 despite having been marked for removal, since at the prior consistency point the volume 212 had not yet been marked for removal. Thus, the replica site 200 may complete reversion to the prior consistency point and then may change the status of the replica volume 212 in the replica journal entry from pending removal to admitted.

As another example, if a virtual volume 112 has the pending removal status or the pre-pending removal status at the primary site 100 upon a recovery operation being performed, then that would mean that the failover occurred after the virtual volume 112 was marked for removal from the group but before a next synchronization operation was begun and/or successfully completed. Accordingly, the primary site 100 may change the status of the virtual volume 112 in the journal entry from pending removal to admitted.

As another example, if a replica volume 212 has the imminent removal status at the replica site 200 upon a failover occurring, then that would mean that the failover occurred after the virtual volume 112 was marked for removal and the next synchronization operation successfully completed, but before the removal of the replica volume 212 finished. Accordingly, when the replica site 200 reverts to the prior consistency point, the replica volume 212 may be re-cued to be removed from the replication group 115.

As another example, if a virtual volume 112 has the imminent removal status at the primary site 100 upon a recovery operation being performed, then that would mean that the failover occurred after the virtual volume 112 was marked for removal and the next synchronization operation successfully completed, but before the removal of the replica volume 212 finished. Accordingly, primary site 100 may re-cue the virtual volume 112 to be removed from the replication group 115.

[Example Machine Readable Media Storing Example Instructions]

Figure 8:
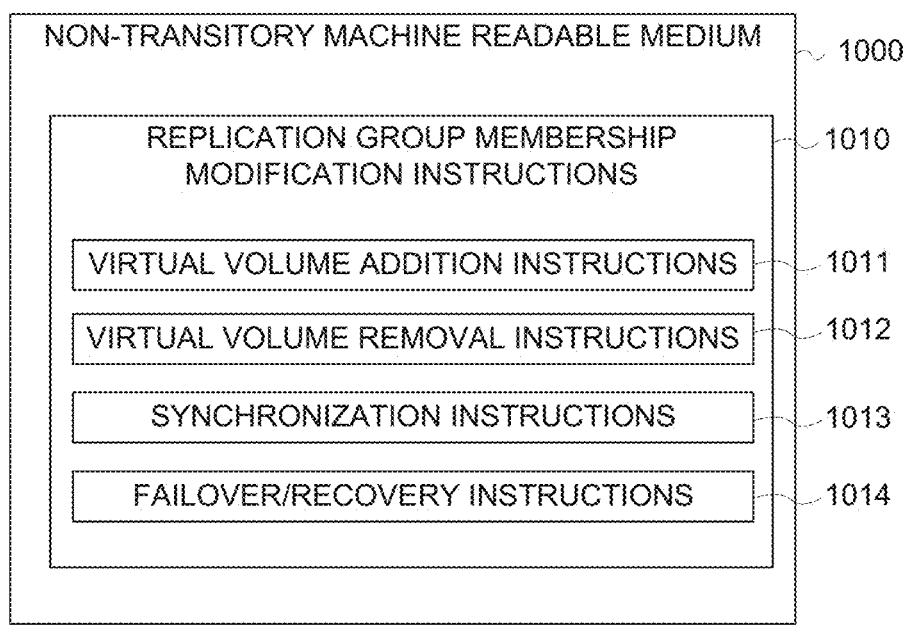
FIG. 8 is a block diagram illustrating an example non-transitory machine readable medium storing example adaptive sounding control instructions.

FIG. 8 illustrates an example non-transitory machine readable medium 1000 that stores replication group membership modification instructions 1010 that are executable by processing circuitry (such as the processing circuitry 120 and/or 220). The replication group membership modification instructions 1010, when executed by processing circuitry, may cause the processing circuitry to perform any of the example operations described herein in relation to modification of the membership of a replication group, such as the example processes illustrated in FIGS. 3-7. For example, the replication group membership modification instructions 1010 may include virtual volume addition instructions 1011, virtual volume removal instructions 1012, synchronization instructions 1013, and failover/recovery instructions 1014. The non-transitory machine readable medium 1000 may be any non-transitory machine readable medium, which may include volatile storage media (e.g., DRAM, SRAM, etc.) and/or non-volatile storage media (e.g., PROM, EPROM, EEPROM, NVRAM, flash, hard drives, optical disks, etc.).

The virtual volume addition instructions 1011 include instructions that, when executed by processing circuitry, may cause the processing circuitry to perform the operations described above in relation to addition of virtual volumes 112 to the replication group 115. For example, the virtual volume addition instructions 1011 may include instructions corresponding to the processes illustrated in FIGS. 3-4.

The virtual volume removal instructions 1012 include instructions that, when executed by processing circuitry, may cause the processing circuitry to perform the operations described above in relation to removal of virtual volumes 112 from the replication group 115. For example, the virtual volume removal instructions 1012 may include instructions corresponding to the process illustrated in FIG. 5.

The synchronization instructions 1013 include instructions that, when executed by processing circuitry, may cause the processing circuitry to perform the operations described above in relation to the synchronization operation. For example, the synchronization instructions 1013 may include instructions corresponding to the process illustrated in FIG. 6.

The failover/recovery instructions 1014 include instructions that, when executed by processing circuitry, may cause the processing circuitry to perform the operations described above in relation to the failover and/or recovery operations.

Throughout this disclosure and in the appended claims, occasionally reference may be made to "a number" of items. Such references to "a number" mean any integer greater than or equal to one. In other words, "a number" means the same thing as "at least one". When "a number" is used in this way, the word describing the item(s) may be written in pluralized form for grammatical consistency, but this does not necessarily mean that multiple items are being referred to. Thus, for example, a phrase such as "a number of processors, wherein the processors . . . " could encompass both one processor and multiple processors, notwithstanding the use of the pluralized form.

The fact that the phrase "a number" may be used in referring to some items should not be interpreted to mean that omission of the phrase "a number" when referring to another item means that the item is necessarily singular or necessarily plural.

In particular, when items are referred to using the articles "a", "an", and "the" without any explicit indication of singularity or multiplicity, this should be understood to mean that there is "at least one" of the item, unless explicitly stated otherwise. When these articles are used in this way, the word describing the item(s) may be written in singular form for grammatical consistency, but this does not necessarily mean that only one item is being referred to. Thus, for example, a phrase such as "a processor, wherein the processor . . . " could encompass both one processor and multiple processors, notwithstanding the use of the singular form.

Occasionally the phrase "and/or" is used herein in conjunction with a list of items. This phrase means that any combination of items in the list—from a single item to all of the items and any permutation in between—may be included. Thus, for example, "A, B, and/or C" may include any one of: {A}, {B}, {C}, {A, B}, {A, C}, {C, B}, and {A, C, B}.

Various example processes were described above, with reference to various example flow charts. In the description and in the illustrated flow charts, operations are set forth in a particular order for ease of description. However, it should be understood that some or all of the operations could be performed in different orders than those described and that some or all of the operations could be performed concurrently.

While the above disclosure has been shown and described with reference to the foregoing examples, it should be understood that other forms, details, and implementations may be made without departing from the spirit and scope of this disclosure.

What is claimed is:

1. A method of controlling a storage system that includes a replication group, the method comprising:

adding a virtual volume to the replication group by storing a journal entry for the virtual volume at a source site, the journal entry including:
metadata for hooking the virtual volume to a corresponding replica volume; and
data indicating a status of the virtual volume;
sending a message to a replica site instructing it to create the corresponding replica volume for the virtual volume and store a replica journal entry for the replica volume; and
determining whether to set the status of the virtual volume to pending admittance or newly admitted based on whether the replica site was able to successfully create the replica volume and store the replica journal entry,
wherein the pending admittance status indicates that the virtual volume is not to be included in a next synchronize operation and the newly admitted status indicates that the virtual volume is to be included in the next synchronize operation.

2. The method of claim 1, further comprising:
in response to the replica site successfully storing the replica journal entry, changing the status of the virtual volume to newly admitted.

3. The method of claim 1,
wherein the replication group includes multiple virtual volumes,
the method further comprising:
initiating a synchronization operation for the replication group in which those of the virtual volumes that have an admitted status and those of the virtual volumes that have a newly admitted status are synchronized to the replica site, and
in response to the synchronization operation being successfully completed, changing the status of those of the virtual volumes in the replication group that have the newly admitted status to admitted.

4. The method of claim 1, further comprising:
in response to the replica site failing to successfully store the replica journal entry, keeping the status of the virtual volume as pending admittance, and resending the message to the replica site.

5. The method of claim 1,
wherein the replication group includes multiple virtual volumes, and
the method further comprising:
periodically checking whether any of the virtual volumes in the replication group have the pending admittance status, and, in response to identifying one of the virtual volumes as having the pending admittance status, sending a message to the replica site instructing it to store a replica journal entry for the identified virtual volume.

6. The method of claim 1,
wherein the replication group includes multiple virtual volumes, and
the method further comprising:
in response to determining that the status of any of the virtual volumes in the replication group is pending admittance, abstaining from performing a synchronization operation for the replication group until there are no volumes in the replication group whose status is pending admittance.

7. The method of claim 1,
wherein the replication group is not stopped as part of adding the virtual volume to the replication group.

8. The method of claim 1,
wherein the adding the virtual volume to the replication group occurs when links between the primary site and the replica site are disabled or non-functional.

9. The method of claim 1, further comprising:
removing the virtual volume from the replication group by:
changing the status of the virtual volume to pending removal;
at a next synchronization operation:
changing a status of the corresponding replica volume at the replica site to pending removal,
synchronizing the replication group excluding the virtual volume;
in response to the synchronizing being successfully completed, cueing the virtual volume for removal.

10. A storage system comprising:
storage devices at a source site;
a number of processors; and
a non-transitory machine readable medium storing machine readable instructions that, when executed by the processors, cause the processors to:
add a virtual volume to a replication group, which includes multiple virtual volumes at the source site, by storing a journal entry for the virtual volume at the source site, the journal entry including:
metadata for hooking the virtual volume to a corresponding replica volume at a replica site; and
data indicating a status of the virtual volume;
send a message to the replica site instructing it to create the corresponding replica volume and store a replica journal entry for the replica volume;
determine whether the replica site was able to successfully create the replica volume and store the replica journal entry and if so set the status of the virtual volume to newly admitted and if not set the status of the virtual volume to pending admittance; and
periodically initiate a synchronization operation for the replication group in which those of the virtual volumes that have an admitted status and those of the virtual volumes that have the newly admitted status are synchronized to the replica site, while those of the virtual volumes that have the pending admittance status are not synchronized.

11. The storage system of claim 10, wherein the instructions further cause the processors to:
in response to the synchronization operation being successfully completed, change the status of those of the virtual volumes that have the newly admitted status to admitted.

12. The storage system of claim 10, wherein the instructions further cause the processors to:
in response to the synchronization operation failing to successfully complete, maintain the status of those of the virtual volumes that have the newly admitted status as newly admitted.

13. The storage system of claim 10, wherein the instructions further cause the processors to:
remove the virtual volume from the replication group by:
changing the status of the virtual volume to pending removal;
at a next synchronization operation:
changing a status of the corresponding replica volume at the replica site to pending removal,
synchronizing the replication group excluding the virtual volume; and
if the synchronizing is successfully completed, cueing the virtual volume for removal.

14. The storage system of claim 13, wherein the instructions further cause the processors to:
in response to the synchronization operation failing to successfully complete, maintain the status of those of the virtual volumes that have the pending removal status as pending removal.

15. The storage system of claim 13, further comprising:
storage devices as the replica site, wherein the replication group includes multiple replica volumes at the replica site corresponding to the virtual volumes,
wherein the instructions further cause the processors to, in response to a failover, revert the storage devices at the replica site to a most recent consistency point, and keep replica volumes that have a pending admit status in the replication group and change their status to admitted.

16. The storage system of claim 15, further comprising:
second storage devices as the replica site,
wherein the instructions further cause the processors to:
in response to a failover, revert the second storage devices at the replica site to a most recent consistency point and remove those of the replica volumes that have the newly admitted status;
in response to a recovery operation, remove those of the virtual volumes that have the pending admit status and remove those of the virtual volumes that have the newly admitted status.

17. A non-transitory machine readable medium storing machine readable instructions that are to cause a processor that executes the instructions to:
remove a virtual volume from a replication group that includes multiple virtual volumes by executing operations to:
change a status of the virtual volume to pending removal in a journal entry associated with the virtual volume that is stored at a source site; and
at a next synchronization operation:
change a status of a replica volume corresponding to the virtual volume to pending removal in a replica journal entry associated with the replica volume that is stored at a replica site,
synchronize the replication group, excluding the virtual volume, from the source site to the replica site, and
if the synchronizing is successfully completed, change the status of the virtual volume in the journal entry at the source site to imminent removal and cue the virtual volume for removal.

18. The non-transitory machine readable medium of claim 17, wherein the replication group includes multiple replica volumes corresponding to the virtual volumes, and the instructions further cause the processor to:
initiate a failover operation in which:
those of the replica volumes that have the pending removal status are kept in the replication group and their respective statuses are changed to admitted; and
those of the replica volumes that have the imminent removal status are removed from the replication group.

19. The non-transitory machine readable medium of claim 17, wherein the instructions further cause the processor to:
for each one of the virtual volumes whose removal from the replication group has been requested, change the status of the virtual volume to pending removal if a re-synchronization snapshot of the virtual volume at the primary site matches a replica of the virtual volume at the replica site and otherwise change the status of the virtual volume to pre-pending removal.

20. The non-transitory machine readable medium of claim 19, wherein the instructions further cause the processor to:
at each synchronization operation,
for each one of the virtual volumes that has the pending removal status, do not synchronize the virtual volume during the current synchronization operation; and
for each one of the virtual volumes that has the pre-pending removal status, synchronize the virtual volume during the current synchronization operation, and thereafter change its status to pending removal.

21. The method of claim 1,
wherein the replication group includes multiple virtual volumes, and
the method further comprising:
initiating a synchronization operation for the replication group in which those of the virtual volumes that have an admitted status and those of the virtual volumes that have a newly admitted status are synchronized to the replica site, and
in response to the synchronization operation failing to successfully complete, maintaining the status of those of the virtual volumes having the newly admitted status as newly admitted.

* * * * *